United States Patent

Muse et al.

(10) Patent No.: US 12,354,503 B2
(45) Date of Patent: Jul. 8, 2025

(54) SIGNAGE FASTENER

(71) Applicant: Pratt Corrugated Holdings, Inc., Brookhaven, GA (US)

(72) Inventors: John Richard Muse, Atlanta, GA (US); John Taddei, Locust Grove, GA (US)

(73) Assignee: Pratt Corrugated Holdings, Inc., Brookhaven, GA (US)

( * ) Notice: Subject to any disclaimer, the term of this patent is extended or adjusted under 35 U.S.C. 154(b) by 139 days.

(21) Appl. No.: 18/130,975

(22) Filed: Apr. 5, 2023

(65) Prior Publication Data

US 2023/0343247 A1 Oct. 26, 2023

Related U.S. Application Data

(63) Continuation-in-part of application No. 29/836,179, filed on Apr. 25, 2022.
(Continued)

(51) Int. Cl.
*G09F 7/18* (2006.01)
*A47F 5/00* (2006.01)
*F16B 13/04* (2006.01)

(52) U.S. Cl.
CPC ............... *G09F 7/18* (2013.01); *A47F 5/005* (2013.01); *F16B 13/04* (2013.01); *G09F 2007/1821* (2013.01)

(58) Field of Classification Search
CPC ......... A47B 57/40; A47B 57/48; A47B 57/50; A47F 5/101; A47F 5/0006; A47F 5/0815;
(Continued)

(56) References Cited

U.S. PATENT DOCUMENTS 1,261,835 A * 4/1918 Martin ............... A44B 17/0041
24/666
2,937,834 A 5/1960 Orenick et al.
(Continued)

FOREIGN PATENT DOCUMENTS

GB 2369402 6/2004

OTHER PUBLICATIONS

Alitools; Article entitled: "50pcs Nylon Cable Tie Fastener Clips Car Loom Hose Clamp Fastening Zip Strap CYX Cable Cable Tie Hose Clamp", available at <https://alitools.io/en/showcase/50pcs-nylon-cable-tie-fastener-clips-car-loom-hose-clamp-fastening-zip-strap-cyx-cable-cable-tie-hose-clamp-4000169514467>, accessed on Feb. 24, 2022, 4 pgs.
(Continued)

*Primary Examiner* — Cassandra Davis
(74) *Attorney, Agent, or Firm* — Taylor Duma LLP

(57) ABSTRACT

A display system includes: a first upright oriented vertically; a second upright oriented vertically and offset horizontally from the first upright by a frame separation distance, the first upright and the second upright each having a plurality of openings therein and together defining a display opening therebetween; a first fastener attached to a display panel and inserted into one of the plurality of openings in the first upright; and a second fastener attached to the display panel and inserted into one of the plurality of openings in the second upright, each of the first fastener and the second fastener comprising a first portion and a second portion, the first portion having a first stud and a second stud, the second portion having an opening for receiving the first stud, the first stud configured to be inserted through a display panel and secured in the opening, the second stud configured to be inserted into one of the plurality of holes in the first upright
(Continued)

or second upright, whereby the first and second fasteners hold the display panel in the display opening.

23 Claims, 10 Drawing Sheets

Related U.S. Application Data

(60) Provisional application No. 63/334,405, filed on Apr. 25, 2022.

(58) Field of Classification Search
CPC ........ A47F 5/083; A47F 5/0838; A47F 5/005; G09F 7/18; G09F 2007/1821; F16B 13/04; F16B 12/22
USPC ............ 248/220.22, 220.31, 220.41, 220.42, 248/220.43; 24/666
See application file for complete search history.

(56) References Cited

U.S. PATENT DOCUMENTS

| | | | |
|---|---|---|---|
| 3,169,004 A * | 2/1965 | Rapata | F16B 2/08 248/74.5 |
| 3,275,969 A * | 9/1966 | Sheeran | H02G 11/003 439/527 |
| 6,394,695 B1 * | 5/2002 | Chausset | F16B 5/065 403/397 |
| 6,431,585 B1 * | 8/2002 | Rickabus | B60R 21/216 280/730.2 |
| 6,443,403 B1 | 9/2002 | Page et al. | |
| 7,207,529 B2 | 4/2007 | Rosemann et al. | |
| 7,222,399 B2 | 5/2007 | Eisenbraun | |
| 7,338,068 B2 | 3/2008 | Kawai et al. | |
| 7,559,587 B2 | 7/2009 | Mangone, Jr. | |
| 7,698,788 B2 | 4/2010 | Hansen et al. | |
| D624,811 S | 10/2010 | Wakabayashi | |
| 7,832,064 B2 | 11/2010 | Nessel et al. | |
| 7,832,693 B2 | 11/2010 | Moerke et al. | |
| 7,997,542 B2 | 8/2011 | Morello | |
| 8,651,344 B2 | 2/2014 | Norman et al. | |
| 8,739,387 B1 | 6/2014 | Frishberg | |
| 10,573,207 B2 | 2/2020 | Tuttle et al. | |
| 10,614,731 B2 | 4/2020 | Tuttle | |
| 10,994,906 B2 | 5/2021 | Chmelar | |
| 11,006,700 B1 | 5/2021 | Emile | |
| 11,125,264 B2 * | 9/2021 | Liebelt | F16B 37/043 |
| 2005/0285375 A1 * | 12/2005 | Kawai | B60R 21/215 280/730.2 |
| 2017/0140677 A1 | 5/2017 | Ibanez Fernandez De Lis | |
| 2017/0221389 A1 | 8/2017 | Petru et al. | |

OTHER PUBLICATIONS

Fixtures Close Up; Article entitled: "Rubbermaid Merchandising Zip Tie", available at <https://www.fixturescloseup.ciom/2016/02/07/rubbermaid-merchandising-zip-tie/, accessed on Feb. 24, 2022, 11 pgs.

Fixtures Close Up; Article entitled: "Zip Tie Merchandising Carded Stock", available at <http://www.fixturescloseup.com/2017/03/14/zip-tie-merchandising-carded-stock/>, accessed on Feb. 24, 2022, 10 pgs.

Hellermann Tyton; Specification Sheet for Part No. 156-00155, publicly available prior to Apr. 25, 2022, 3 pgs.

* cited by examiner

SIGNAGE FASTENER

CROSS-REFERENCE TO RELATED APPLICATIONS

This application claims priority to U.S. Provisional Application No. 63/334,405, filed Apr. 25, 2022, and is a Continuation-in-Part of U.S. patent application Ser. No. 29/836,179, filed Apr. 25, 2022, both of which are hereby specifically incorporated by reference herein in their entirety.

FIELD OF USE

This disclosure relates to fasteners for removably attaching a panel to a frame. More specifically, this disclosure relates to fasteners for removably attaching a display panel to a rack inside a store.

RELATED ART

Display systems such as used inside a retail business often serve the dual purposes of storing product and displaying advertising or otherwise drawing attention to the product. It can be beneficial to position a printed display panel—containing graphics describing the product and its features and benefits, for example—between uprights in a frame used to store and display the product. The size of the frame and the display panel and the distance between any fastening holes in the structural members can present challenges for mounting a display panel in a stable position. The same display panels that are typically used cannot be easily and securely attached to the frame without degrading the appearance of the display system and also requiring more time-consuming, and therefore costly, fasteners or attachment methods.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a fastener comprising a first portion a second portion and a flexible connecting portion connecting the first portion to the second portion. The first portion comprises a base, a first stud extending from the base in a first direction, and a second stud extending from the base in a second direction. The second portion comprises an opening sized to receive the first stud and a retention mechanism for engaging the first stud and retaining the first stud in the opening.

In another aspect, disclosed is a monolithic fastener comprising a first portion, a second portion, and a flexible connecting portion connecting the first portion to the second portion. The first portion comprises a base, a first stud extending from the base in a first direction, the first stud comprising a head and a cutout, the cutout located between the head and the base, and a second stud extending from the base in a second direction, the second stud comprising a flange extending parallel to the base for engaging a teardrop-shaped opening in a structure. The second portion comprises a keyhole-shaped opening sized to receive the first stud and a ridge positioned adjacent the keyhole-shaped opening for engaging the head of the first stud and retaining the first stud in the keyhole-shaped opening.

In yet another aspect, disclosed is a method of assembling a display system. The method comprises inserting a first stud of a first portion of a first monolithic fastener through a first opening in a first corner of a display panel, the first stud of the first monolithic fastener comprising a head and a cutout, the cutout located between the head and a base of the first portion of the first monolithic fastener. A second portion of the first monolithic fastener is placed over the first stud so that the first stud is inserted into an opening in the second portion. The second portion of the first monolithic fastener is repositioned relative to the first portion so that a ridge on the second portion passes through the cutout, and the head of the first stud engages the ridge and is retained in the second portion by the ridge. A first stud of a first portion of a second monolithic fastener is inserted through a second opening in a second corner of a display panel, the first stud of the second monolithic fastener comprising a head and a cutout, the cutout located between the head and a base of the first portion of the second monolithic fastener. A second portion of the second monolithic fastener is placed over the first stud of the second monolithic fastener so that the first stud is inserted into an opening in the second portion. The second portion of the second monolithic fastener is repositioned relative to the first portion of the monolithic fastener so that a ridge on the second portion passes through the cutout, and the head of the first stud engages the ridge and is retained in the second portion by the ridge. A second stud of the first portion of the first monolithic fastener is inserted into a first opening in a first upright in a rack system and a second stud of the first portion of the second monolithic fastener is inserted into a second opening in a second upright in a rack system, whereby the display panel is suspended from the first and second uprights in the rack system.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
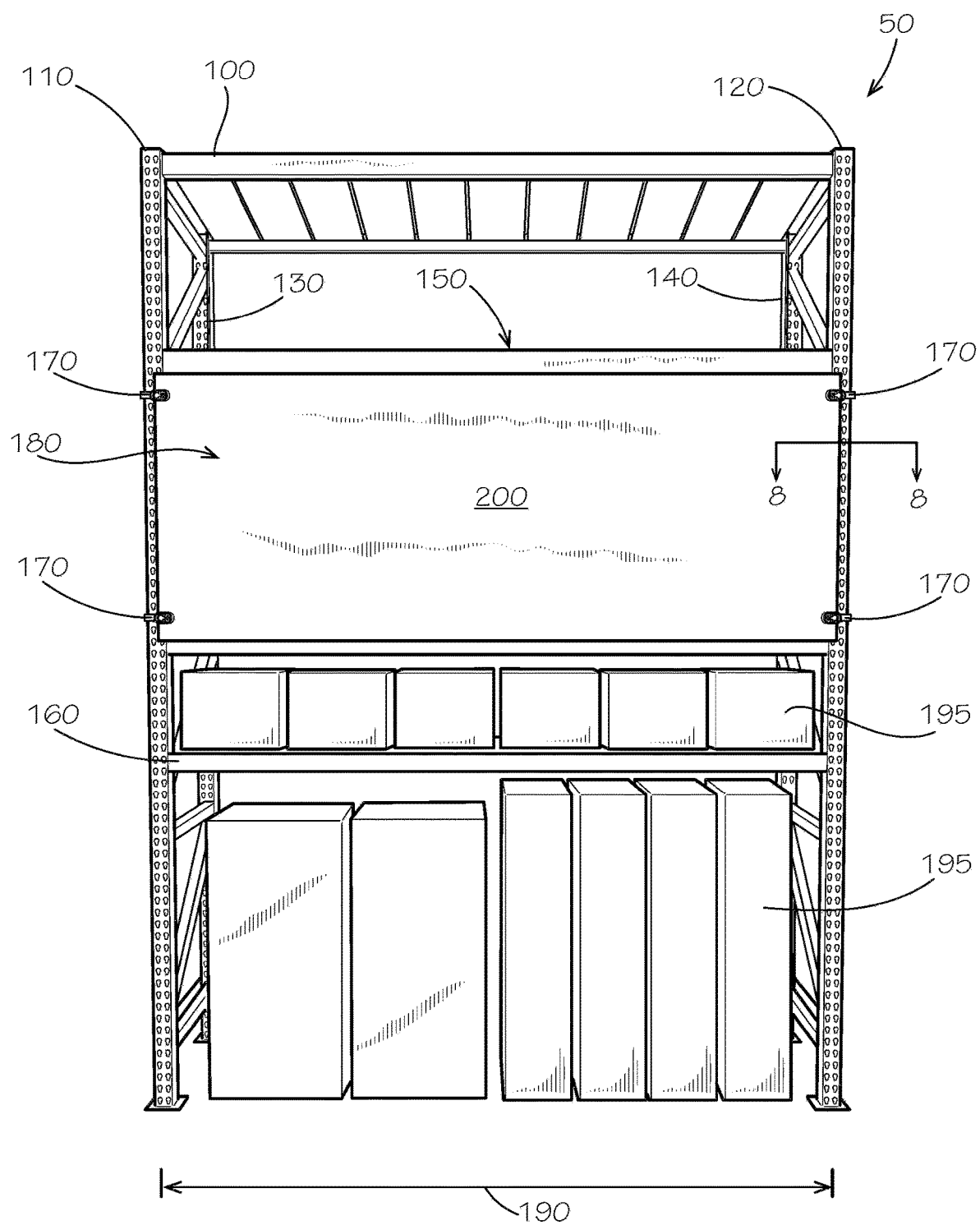
FIG. 1 is a front view of a store display in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications to, and adaptations of, the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end or side of a store display in a store nearest to a customer; "rear" is that end of the store display that is opposite or distal from the front; "left" is that which is to the left of or facing left from the customer while the customer faces towards the front; and "right" is that which is to the right of or facing right from that same person in the same position. "Horizontal" or "horizontal orientation" describes that which is in a plane extending from left to right and aligned with the horizon. "Vertical," "oriented vertically," or "vertical orientation" describes that which is in a plane that is angled at 90 degrees to the horizontal.

In some aspects, a fastener and associated methods, systems, devices, and various apparatuses are disclosed herein. In some aspects, the fastener can define a first stud formed on a first portion and configured to be inserted through a display panel and into an opening formed in a second portion of the fastener. A second stud on the first portion of the fastener is inserted into a hole on the upright that forms a part of the frame or rack.

As shown in FIG. 1, a display system 50 can comprise a frame 100 comprising a first upright 110 and a second upright 120. The display system 50 can further comprise a third upright 130 and a fourth upright 140. As shown, each of the uprights 110, 120, 130, 140 can be oriented vertically. Moreover, each of the uprights 110, 120, 130, 140 can comprise a frame member, a vertical rail, a post, or a column. The first upright 110 and the second upright 120 can be considered front uprights, and the third upright 130 and the fourth upright 140 can be considered rear uprights. The second upright 120 can be offset horizontally from the first upright 110 by a frame separation distance 190. Likewise, the fourth upright 140 can be offset horizontally from the third upright 130 by the frame separation distance 190, although the offset or frame separation distance between the third upright 130 and the fourth upright 140 can be different than the offset or frame separation distance between the first upright 110 and the second upright 120 in other aspects. The first upright 110 and the second upright 120 can define a display opening 180 therebetween.

The frame 100 can further comprise a plurality of cross rails 150 and shelves 160, each of which can extend between one of the uprights 110, 120, 130, 140 and another of the uprights 110, 120, 130, 140. A space between any two uprights 110, 120, 130, 140, including on a floor beneath the frame 100 or on the shelves 160, can be used for storage of items or materials such as, for example and without limitation, boxes 195, a palletized load (not shown), and products for display to users of the display system 50 (including, for example and without limitation, customers and employees of a business). The display system can also include a display panel 200, which can be mounted in the manner described below.

In some aspects, the display panel 200 can be secured to uprights such as, for example and without limitation, the first upright 110 and the second upright 120 using fasteners 170. Such fasteners can include, for example and without limitation, wire ties, tape (such as, for example and without limitation, double-sided foam tape), adhesive, or screws. To drive sales, it can be advantageous for the display panel 200 to not only be informative but to also be attractive. It can also be advantageous for the display panel 200 to be able to be precisely secured at any X, Y, or Z location relative to the frame 100 to maximize visibility and readability.

The display panel 200 itself can comprise any one of a number of materials receptive to printing processes or a printed film. Such materials can include, for example and without limitation, paper, plastic, or metal. Where a paper-based material is used, the display panel 200 can comprise a material such as, for example and without limitation a corrugated cardboard. Corrugated cardboard can combine the benefits of light weight, low cost, and strength. In other aspects, the display panel 200 can comprise a corrugated plastic material.

As shown, however, the use of wire ties as the fasteners 170 can result in uneven and unsightly gaps and loose connections between the display panel 200 and each of the uprights 110, 120. Furthermore, use of wire ties as the fasteners 170 can mean that the display panel 200 must be supported by the shelf 160 and cannot be suspended above the shelf 160—or must be secured so tightly with the wire ties so as to cause deformation to the display panels 200. Using other fasteners can be accompanied by other problems. For example and without limitation, tape and adhesive can be time-consuming and messy to install and remove and can permanently damage the display panel 200 in the process. Screws and other mechanical fasteners can also be time-consuming to install, they can be visible and therefore can detract from the aesthetic appeal of the display panel 200 and thus render the installed display panel 200 unattractive, and their use can require adapters, spacers, or shims that are cumbersome to install and ineffective in some cases. In some aspects requiring removable fasteners 170, long bolts extending through holes 205 (shown in FIG. 2) defined in the uprights 110, 120, 130, 140 can be required to secure the display panel 200. This can be because the holes 205 in the uprights 110, 120, 130, 140 of the frame 100 may not be designed for mounting of the display panels 200 shown but rather to mount other items or to facilitate attachment of the cross rails 150 and the shelves 160 to the uprights 110, 120, 130, 140 at any one of dozens of vertical positions. Nonetheless, the display system 50 can be adapted to fit even pre-existing features of the frame 100.

Figure 3:
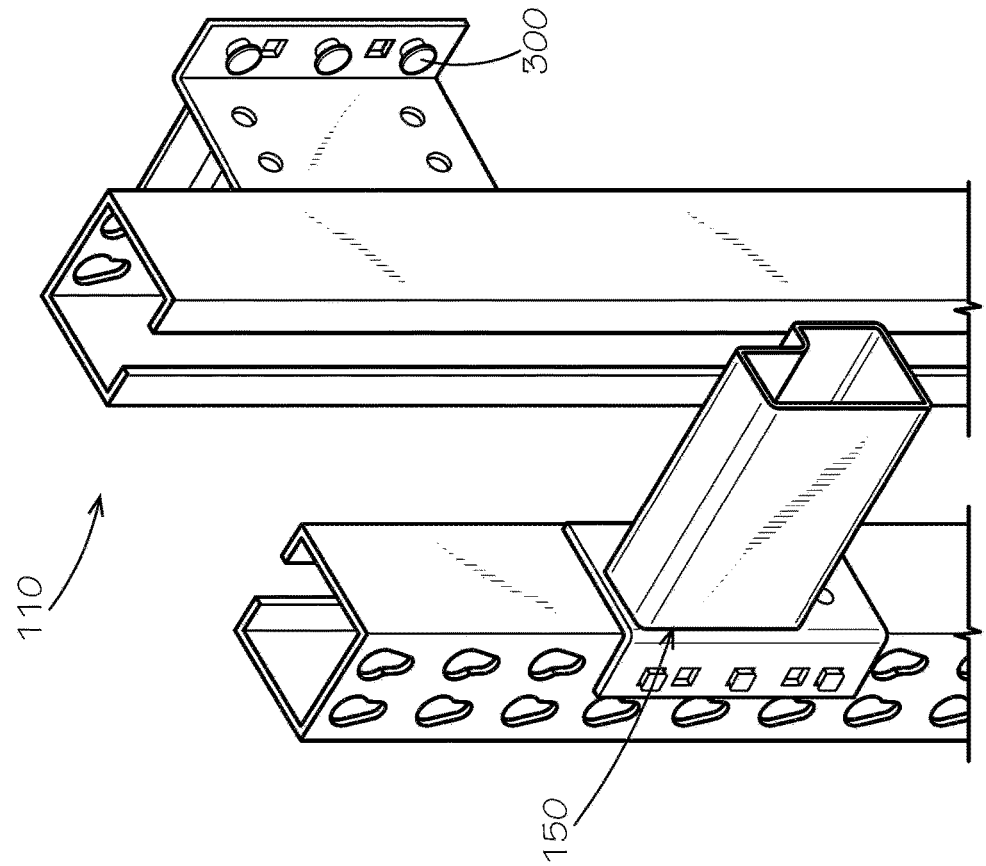
FIG. 3 is a perspective view of the vertical uprights and horizontal beams used in store display of the type shown in FIG. 1.
Figure 2:
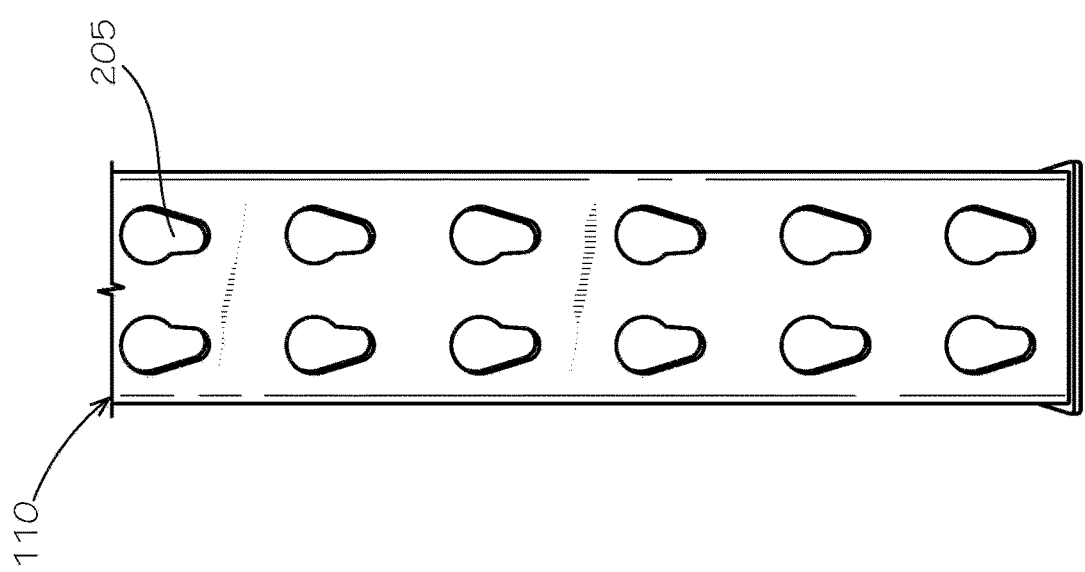
FIG. 2 is a view of a portion of one of the uprights on the store display of FIG. 1 and shows the teardrop-shaped holes formed in the uprights.
Figure 4A:
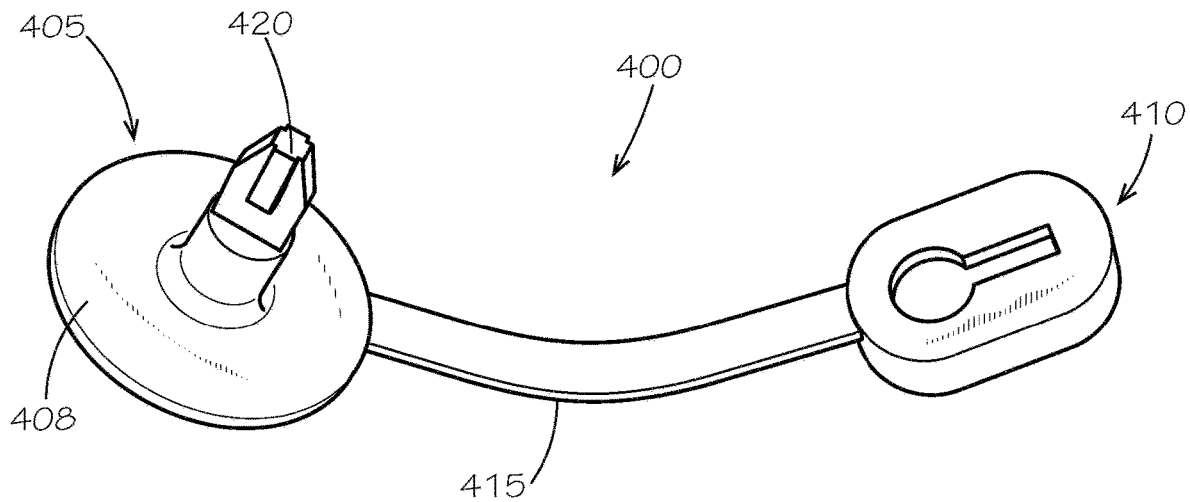
FIG. 4A is a view of a fastener (in its open position) used to hold a display panel on the store display of FIG. 1.
Figure 4B:
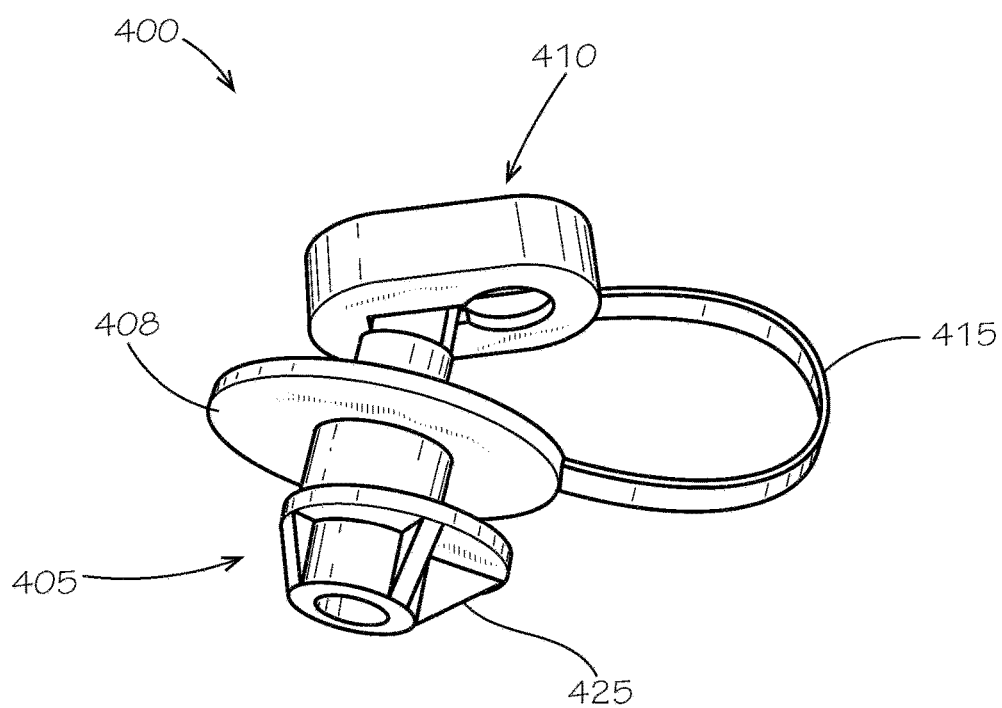
FIG. 4B is a view of the fastener of FIG. 4A in its fastened or closed configuration.
Figure 5:
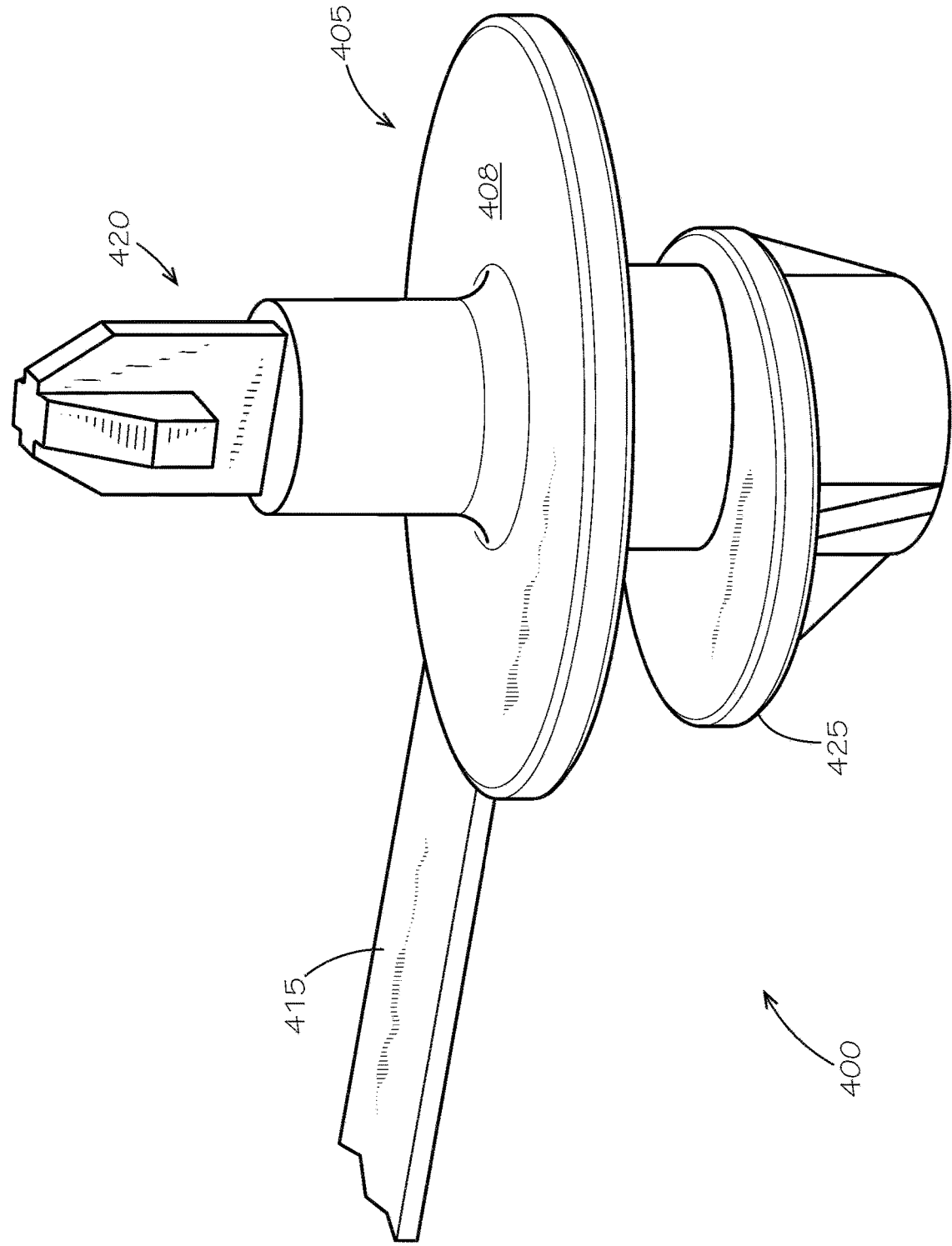
FIG. 5 is a perspective view of the first portion of a fastener as shown in Figure FIGS. 4A and 4B.

Turning now to FIG. 2, in some aspects, the uprights 110, 120, 130, 140 can define holes 205, which can have a teardrop shape and, while used at times to loosely secure fastener 400 (as described below), can also be used to facilitate assembly of the frame 100. FIG. 3 illustrates the front and rear of an upright 110, 120, 130, 140 and cross rails 150. The holes 205 can facilitate assembly by accepting an assembly fastener or pin that is formed on mounting plates on the cross rails 150. The pins 300 can be inserted through the larger (upper) end of the hole 205 and lock in the smaller (lower) end of the hole 205.

The type of racking shown in FIGS. 1-3 is known as teardrop racking and is widely used in warehouses and retail stores, such as The Home Depot stores. This racking style is popular because it is very easy to install and reconfigure. Many American companies manufacture teardrop components, which are generally interchangeable.

In some embodiments, teardrop beams and uprights are made of roll formed steel. Uprights have punched holes shaped like upside-down teardrops, giving it the name. These holes accept pins in the beams, forming the primary support connection. The holes and pins typically have a 2" vertical spacing. This is a convenient convention for setting beam levels.

Several companies manufacture teardrop racking. This means there is little chance of the style becoming obsolete any time soon and parts are easy to find. This type of racking is also relatively easy to dismantle and reuse. Teardrop racking may also be integrated with other racking systems, such as drive-in, push-back, pallet-flow, pick modules and more.

Installation of teardrop racking is also straightforward and most racking installers are highly familiar with this type of racking. In addition, one person can usually install a teardrop beam. Some other styles have additional clips that may require two people to install one beam.

FIGS. 4A, 4B, 5 and 6A-6D illustrate an embodiment of an improved fastener 400 for use in the display system 50 of FIG. 1. The manner in which the fastener 400 may be used is illustrated in FIGS. 7 and 8.

The single-piece, or monolithic, fastener 400 can include a first portion 405 and a second portion 410. The first portion 405 and the second portion 410 can be connected by a flexible strap 415. The first portion 405 includes a base 408, and a first stud 420 and a second stud 425 that extend from the base 408 in opposite directions. The second portion 410 includes opening 430, which is designed to receive the first stud 420. As described below, the first stud 420 is inserted through slits or holes in a display panel 200 and then inserted into the opening 430. The second stud 425 is then inserted into one of the holes in the upright 110 of the rack in order to attach the display panel 200 to the display opening on the rack. The first stud 420 and second stud 425 can also be characterized as protrusions.

Figure 6A:
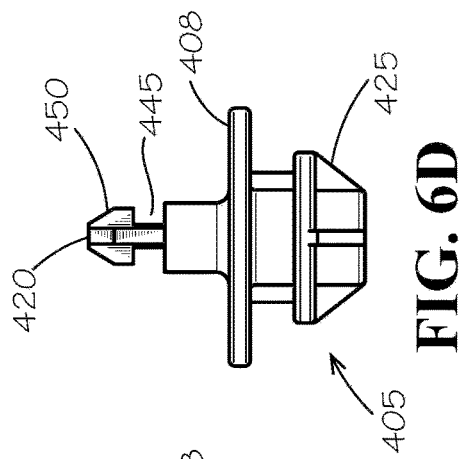
FIGS. 6A-6D provide several views of the fastener of FIGS. 4A and 4B.
Figure 6B:
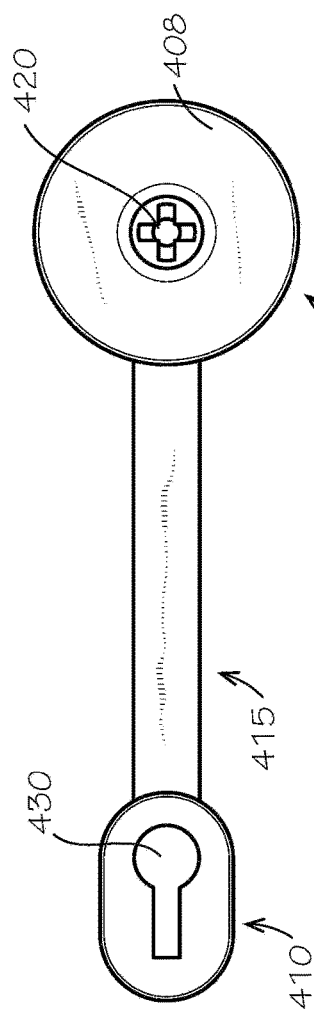
Figure 6C:
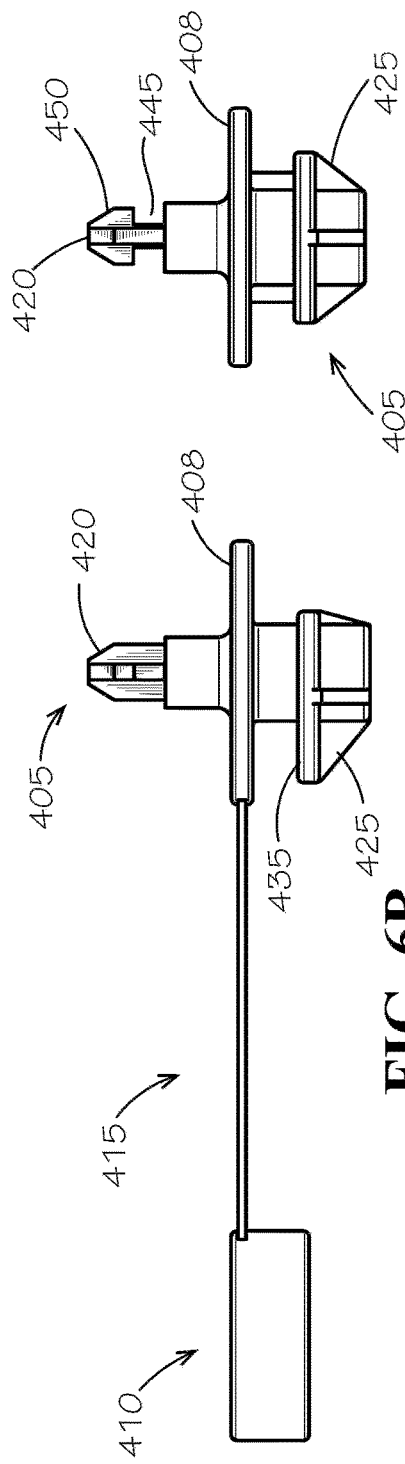
Figure 6D:
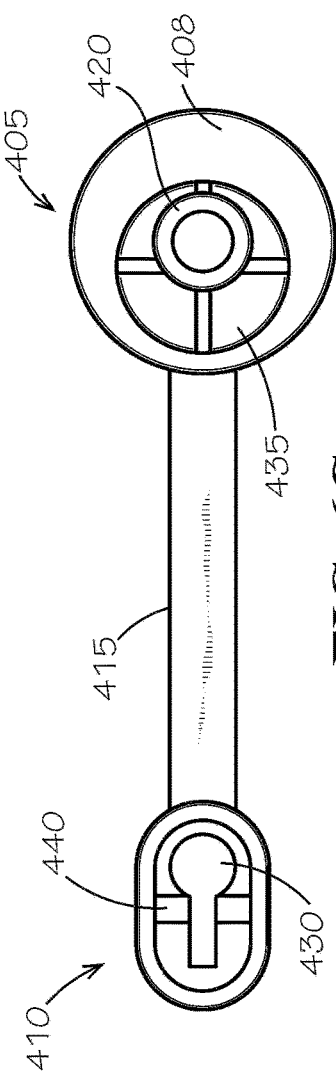

By way of further description, and as illustrated in FIGS. 6B and 6D, the first stud 420 can have a first portion formed adjacent the base 408. The first portion can be round, square, or some other shape, and have a diameter or width that is wider than the narrow, rectangular slot that forms a part of the keyhole-shaped opening 430 of the second portion 410. A second portion 445 of the first stud 420 can be narrower in at least one dimension so that it can fit in the narrow, rectangular slot that forms a part of the keyhole-shaped opening 430 of the second portion. Finally, a third portion of the first stud 420 can comprise a head 450, which can be round, rectangular, or some other shape, including shaped like an arrowhead to facilitate insertion into slits or holes in the display panel 200, provided the head is wider than the narrow, rectangular slot that forms a part of the keyhole-shaped opening 430 of the second portion 410.

Figure 7:
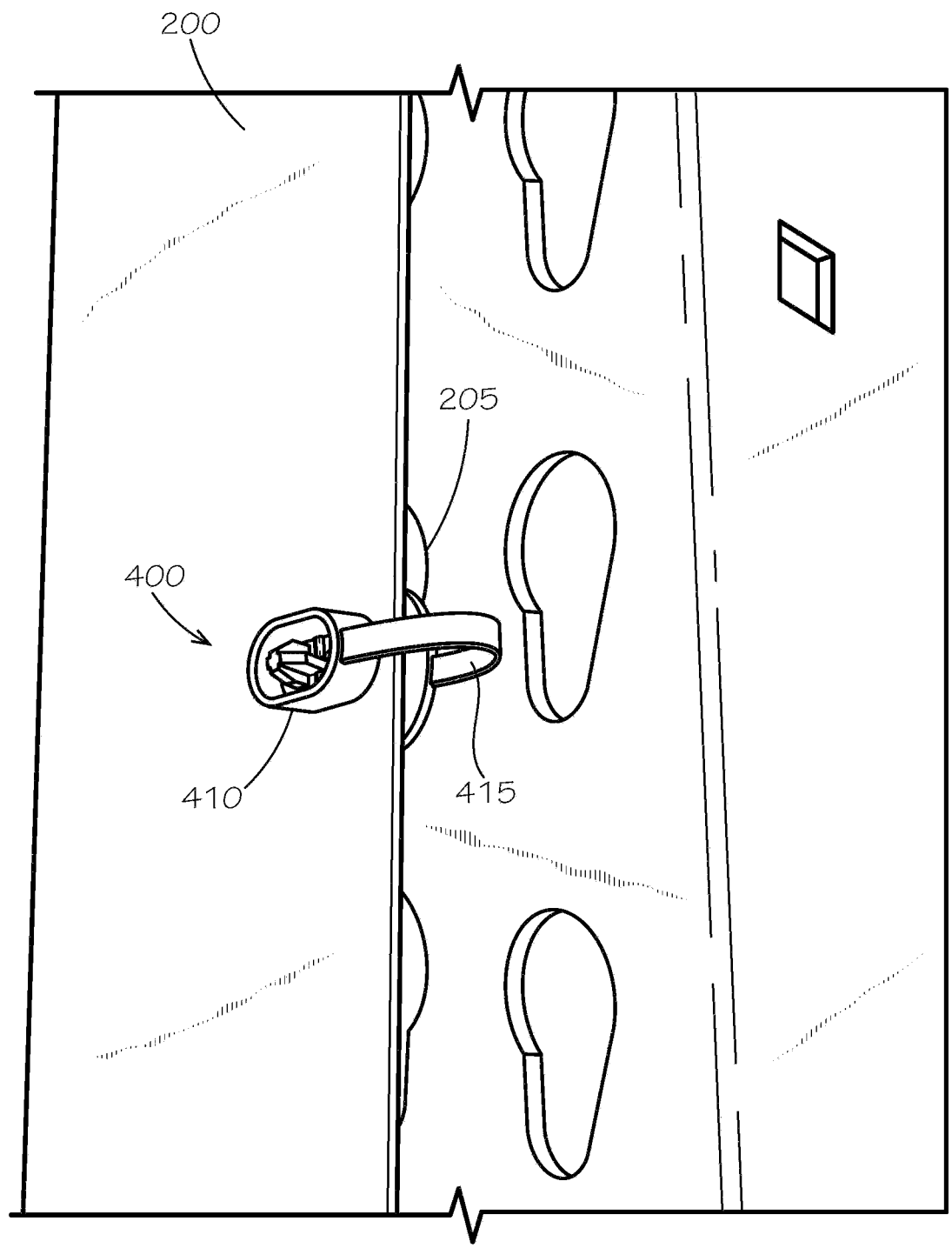
FIG. 7 is a view of fastener attached to a display panel and inserted into one of the openings on an upright on the store display of FIG. 1.
Figure 8:
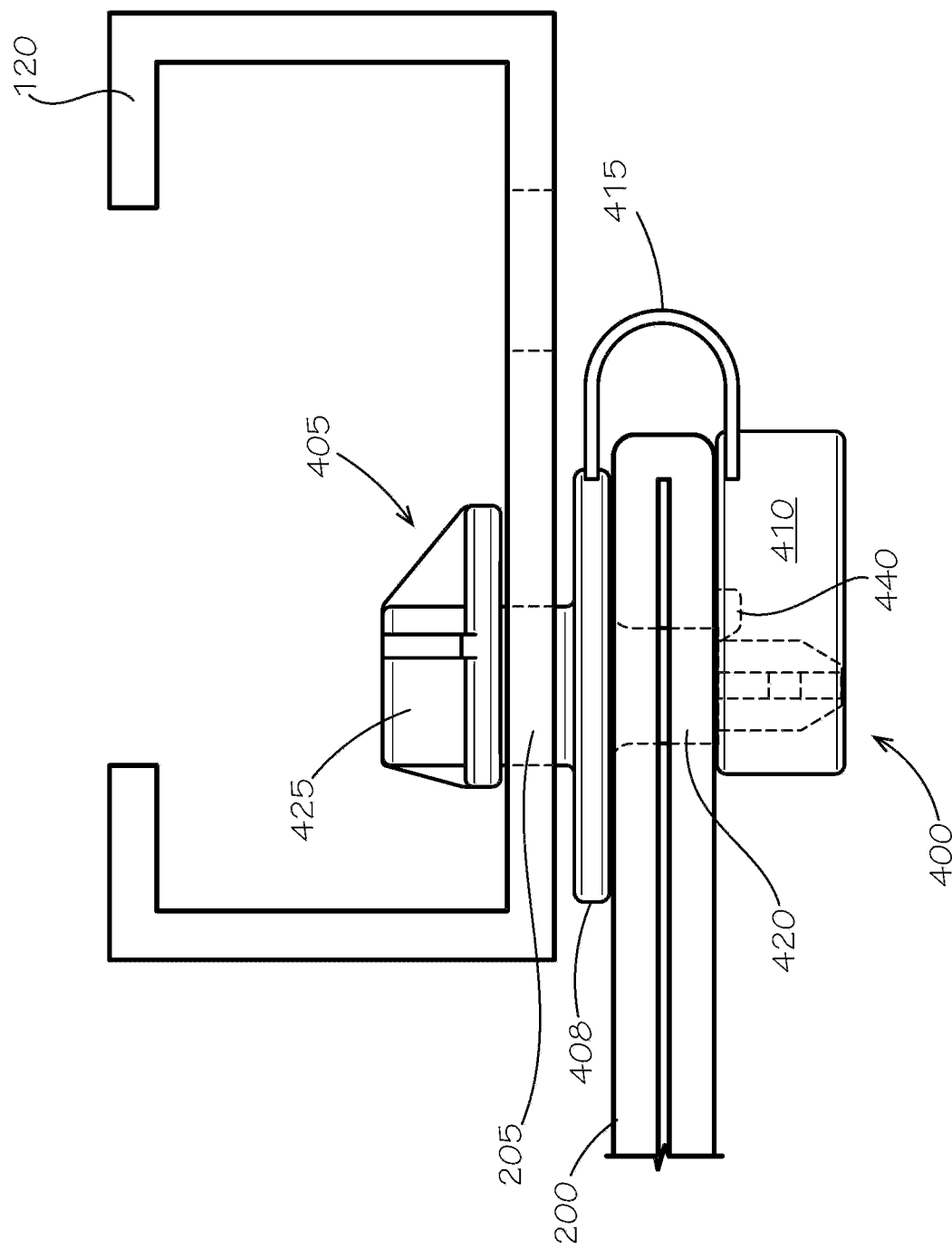
FIG. 8 is a cross-sectional view taken along line 8-8 of FIG. 1, showing the relationship between the fastener, display panel, and upright.
Figure 9A:
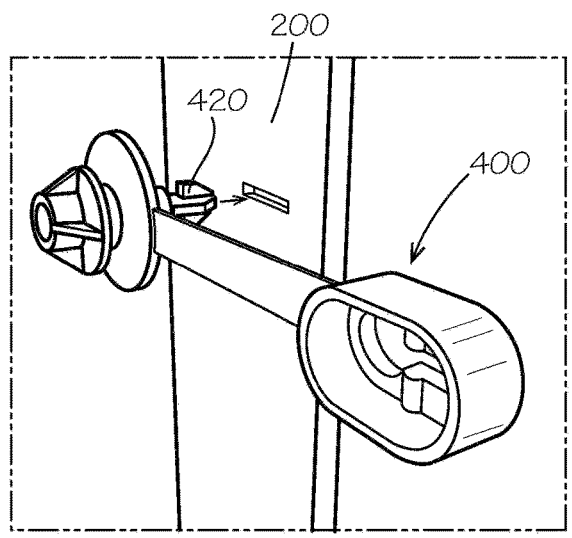
FIGS. 9A-9D illustrate the process of attaching a fastener to a display panel.
Figure 9B:
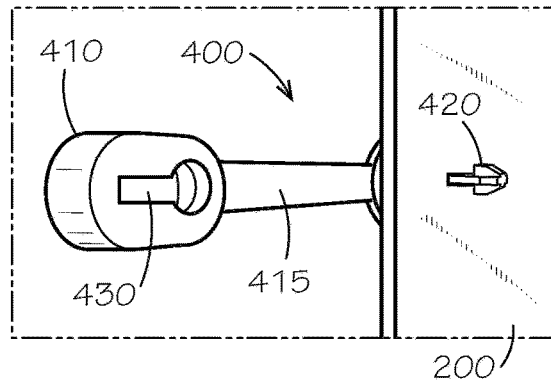
Figure 9C:
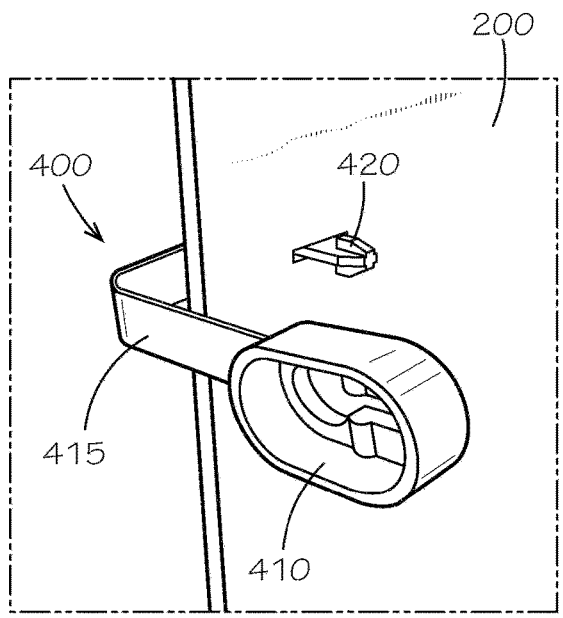
Figure 9D:
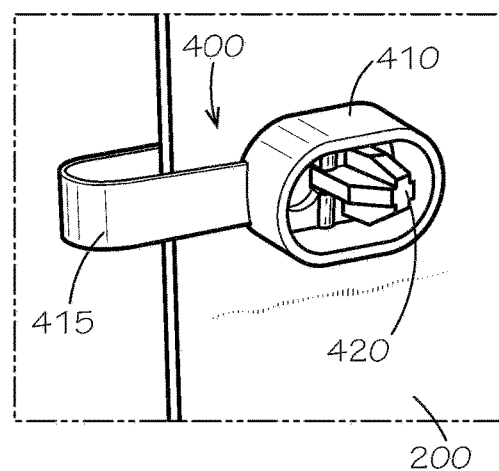
Figure 10A:
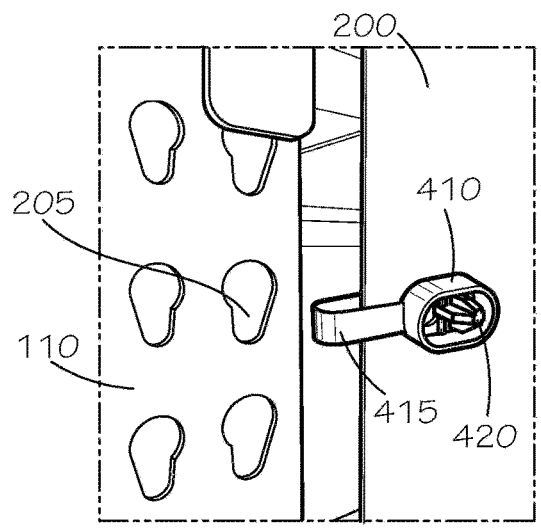
FIGS. 10A-10E illustrate the process of using the fasteners to attach a display panel to an upright of a store display.
Figure 10B:
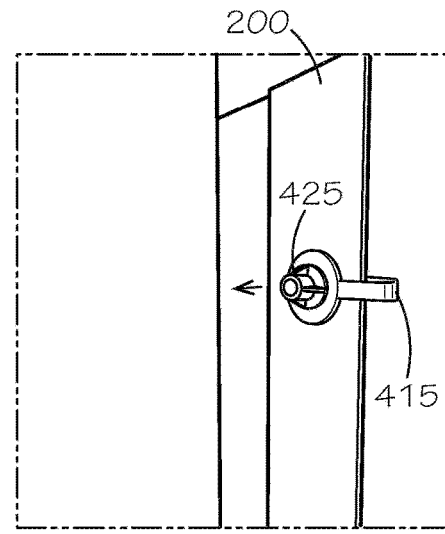
Figure 10C:
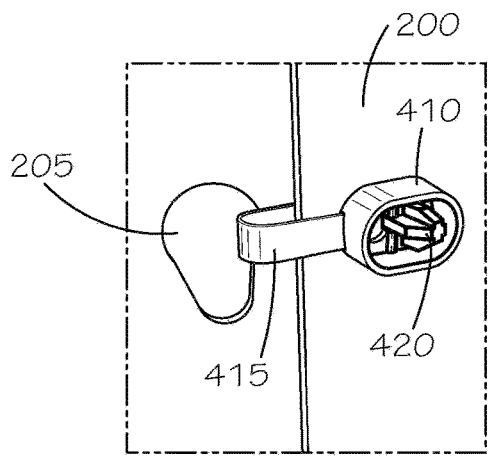
Figure 10D:
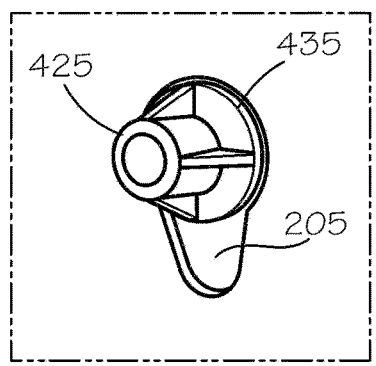
Figure 10E:
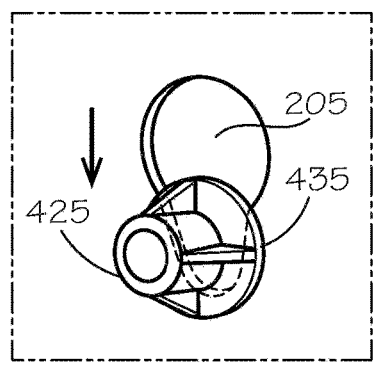

FIG. 7 shows how the fastener 400 may be used with a corrugated cardboard display panel 200. The display panel 200, second portion 410 of the fastener 400, and strap 415 are visible. The second stud 425 is not visible in FIG. 7 but is inserted into the hole 205 in upright 110.

FIG. 8 is a cross-sectional view taken along the line 8-8 of FIG. 1 and illustrates the relationship between the various components of the display system. The display panel 200 may be corrugated cardboard and may be folded back so that the first stud 420 on the first portion 405 of the fastener 400 passes through two layers of the display panel 200. The first stud 420 is inserted into, and held in place in, the opening that may be formed in the second portion 410 of the fastener 400. The second stud is inserted through a hole 205 in the right upright 120. When assembled in this manner, the display panel 200 may be held in place on the rack. The same type of fastener may be used on the opposite end of the display panel to attach the display panel to the left upright 110. When used in this manner, the display panel may be held in place in the display opening 180 (FIG. 1). Those skilled in the art will appreciate that although the display panel may be folded back in the manner described above, it does not have to be. The fasteners 400 can also be used on a single layer of corrugated cardboard or other materials, or on multiple layers of corrugated cardboard or other materials.

FIGS. 9 and 10 illustrate a method of using fasteners 400 to attach a display panel 200 to an upright 110, 120, 130, 140 of a display system 50. First, as illustrated in FIG. 9, the fastener 400 is attached to the display panel 200. In steps 1 and 2 (shown in FIGS. 9A and 9B), the first stud 420 may be inserted through slits, holes, or other openings in at least one, preferably two or more, layers of the display panel 200. In steps 3 and 4 (shown in FIGS. 9C and 9D), the second portion 410 of the fastener 400 is arranged so that the first stud 420 passes through the keyhole-shaped opening 430 in the second portion. The second portion 410 is then slid or repositioned relative to the first portion 405 so that the first stud 420 passes from the round opening portion of the keyhole-shaped opening 430 to the narrow channel portion of the keyhole-shaped opening. At this point, the fastener 400 is attached to the display panel 200.

FIG. 10 illustrates how the fasteners 400 may be used to attach the display panel 200 to an upright after they are attached to the display panel 200. As shown in steps 1 and 2 (shown in FIGS. 10A and 10B), the fastener 400 is aligned with one of the holes 205 in an upright 110. Step 3 (shown in FIG. 10O) shows the second stud 425 of the first portion 405 of the fastener 400 inserted into the hole 205. Steps 4 and 5 (shown in FIGS. 10D and 10E) illustrate how the fastener slides downward and is locked in place in the lower portion of the hole in the upright.

Those skilled in the art will appreciate that the fasteners 400 provide a number of advantages. The fasteners 400 allow for toolless mounting and removal of a variety of signs. A single fastener design may be used on both the left and right sides of a display panel. The one-piece design of the fasteners reduces the possibility of losing a critical part, such as can happen in common nut and bolt systems.

In addition, the second stud may include an offset flange 435 that passes through the upright and drops to the bottom of the opening, thereby implementing the fastening system. The offset flange also allows the sign to be inserted into the upright at the point of the narrowest width measurement between holes, and then to tighten as it is pulled downward by gravity. This employs the angled holes in teardrop racks and similar designs to maintain a taught display panel as well as account for inherent variations in the distance between uprights. The system can account for more than about ⅜" total width variance, which is greater than the variance typically found in the field.

As discussed earlier, in one embodiment, the first stud 420 on the fastener 400 passes through holes or slits in the display panel 200 from back to front and is secured with a slotted coupling (e.g., keyhole-shaped opening) provided in the second part 410 of the fastener 400. There are corresponding parts on the first stud 420 and on the second part 410 that lock these pieces into place once the second part is pulled forward. These parts include a small speedbump-style ridge 440 that is adjacent and can be perpendicular to the narrow part of the keyhole-shaped opening 430 in the second part 410. A narrower portion, such as cutout 445 or a similar undercut, void, or gap (shown in FIG. 6D) under the head 450 of first stud 420 allows the head 450 to slide over the ridge 440 and into the narrow rectangular part of the keyhole-shaped opening 430. The ridge 440 can act as a locking mechanism or retention mechanism to help keep the head 450 of the first stud 420 from unlocking. Because folded corrugated cardboard tends to want to unfold, this system may also take advantage of the "memory" of the folded corrugate to keep spring pressure against the locking coupling.

Figure 11:
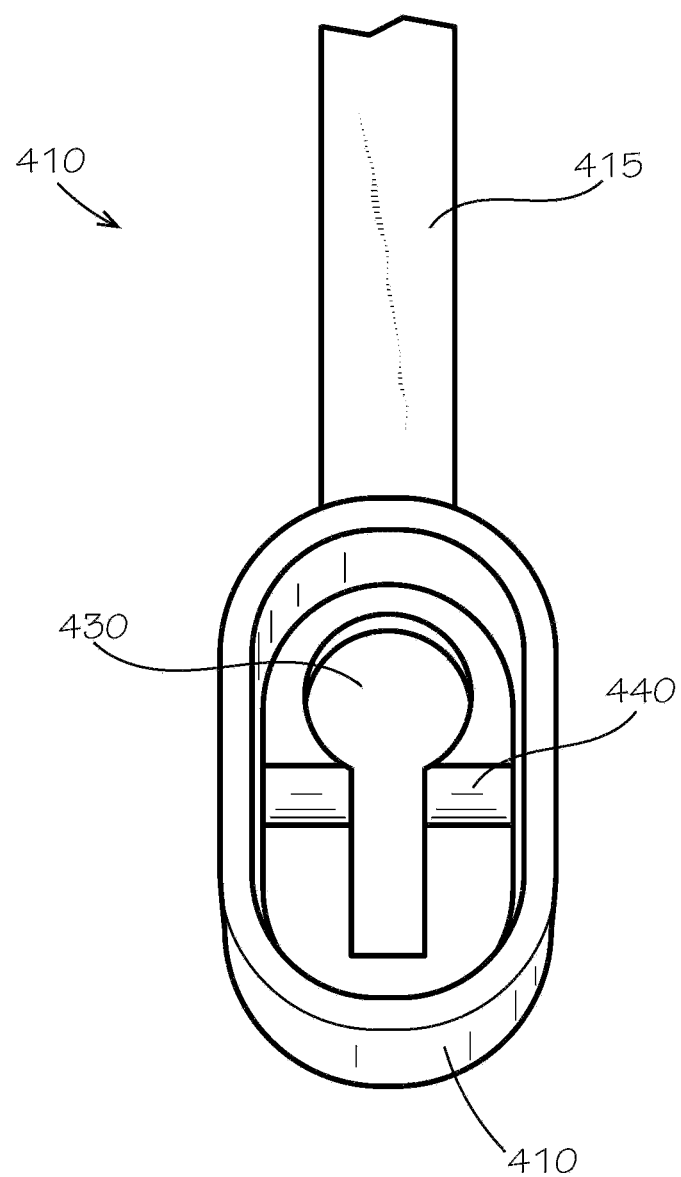
FIG. 11 shows a ridge in the second part of the fastener that is provided to help retain the first part of the fastener in the keyhole-shaped opening.

FIG. 11 provides a better view of the second part 410 and the speedbump-style ridge 440 that is formed perpendicular to the narrow portion of the keyhole-shaped opening 430

Those skilled in the art will appreciate that this system is simple and toolless and can be done with or without the fastener being inserted into the upright. This allows signs to be installed level, at consistent heights and tensions, by a single installer, without tools. The fact that the fasteners do not have sharp edges or points, and do not require the use of screws, drills, or other tools is advantageous because it facilitates compliance with safety guidelines in some environments. In addition, the fasteners may be made of materials (e.g., various plastics) that are inert with respect to the paint or other finishes on the racks and may be installed and removed repeatedly without damaging or scarring the rack.

Those skilled in the art will also appreciate that a display panel may be held in place with two fasteners (e.g., one fastener on the right end and one fastener on the left end, at or near the top of the display panel). Those skilled in the art will appreciate that it may be desirable to use additional fasteners. For example, four fasteners would allow for one fastener at each corner of the display panel. Additional fasteners may be used for larger or flimsier signs to maintain a desirable appearance or to ensure that they are adequately attached to the rack.

Those skilled in the art will appreciate that although the process described above starts with the fastener being attached to the display panel before the fastener is inserted into to the rack, there may be some circumstances where the user of the display system 50 determines that the fasteners should be inserted into the rack before the display panel is attached to the fastener. If so, this can easily be accomplished by modifying the order of the process described above in conjunction with FIGS. 9 and 10.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A monolithic fastener, comprising:
a first portion comprising
a base,
a first stud extending from the base in a first direction, the first stud comprising a first portion adjacent the base, a head, and a cutout, the cutout located between the head and the first portion of the first stud, and
a second stud extending from the base in a second direction, the second stud comprising a flange extending parallel to the base for engaging a teardrop-shaped opening in a structure;
a second portion comprising
a keyhole-shaped opening having a round portion and a slot portion, the keyhole-shaped opening sized to receive the first stud, and
a ridge positioned adjacent the keyhole-shaped opening for engaging the head of the first stud and retaining the first stud in the keyhole-shaped opening; and
a flexible connecting portion connecting the first portion to the second portion,
wherein the width of the first portion of the first stud is greater than a width of the slot portion of the keyhole-shaped opening.

2. The monolithic fastener of claim 1, wherein the fastener comprises plastic.

3. The monolithic fastener of claim 1, wherein the flexible connecting portion allows the first portion to be aligned with the second portion so that the first stud can be inserted into the keyhole-shaped opening.

4. A fastener, comprising:
a first portion comprising
a base,
a first stud extending from the base in a first direction, the first stud comprising a first portion, a head, and a cutout defined between the first portion and the head, and
a second stud extending from the base in a second direction;
a second portion comprising
an opening sized to receive the first stud, the opening comprising a slot portion having a width that is less than a width of the first portion of the first stud, and
a retention mechanism for engaging the first stud and retaining the first stud in the opening; and
a flexible connecting portion connecting the first portion to the second portion.

5. The fastener of claim 4, wherein second stud comprises a flange extending parallel to the base for engaging an opening in a structure.

6. The fastener of claim 4, wherein the opening in the second portion is a keyhole-shaped opening.

7. The fastener of claim 6, wherein the retention mechanism engages the head of the first stud in order to retain the first stud in the keyhole-shaped opening.

8. The fastener of claim 7, wherein the retention mechanism comprises a ridge positioned adjacent the opening.

9. The fastener of claim 4, wherein the fastener comprises plastic.

10. A method of assembling a display system comprising:
inserting a first stud of a first portion of a monolithic fastener through at least one layer of a display panel, the first stud comprising a head and a cutout, the cutout located between the head and a base of the first portion;
placing a second portion of the fastener over the first stud so that the first stud is inserted into an opening in the second portion;
repositioning the second portion relative to the first portion so that a ridge on the second portion passes through the cutout, and the head of the first stud engages the ridge and is retained in the second portion by the ridge; and
inserting a second stud of the first portion of a fastener into an opening in an upright in a rack system,
whereby the display panel is suspended from the upright in the rack system.

11. The method of claim 10, wherein the first portion and second portion of the monolithic fastener are connected by a flexible connecting portion.

12. The method of claim 10, wherein the first stud of the first portion and the second stud of the first portion extend from the base in opposite directions.

13. The method of claim 10, wherein a second stud of the second portion comprises a flange for engaging the opening in the upright in the rack system.

14. The method of claim 10, wherein the opening in the upright in the rack system is a teardrop-shaped opening.

15. The method of claim 10, wherein the opening in the second portion of the fastener is a keyhole-shaped opening.

16. The method of claim 15, wherein the ridge is positioned adjacent the keyhole-shaped opening for engaging the head of the first stud and retaining the first stud in the keyhole-shaped opening.

17. The method of claim 10, wherein the monolithic fastener comprises plastic.

18. A method of assembling a display system comprising:
inserting a first stud of a first portion of a first monolithic fastener through a first opening in a first corner of a display panel, the first stud of the first monolithic fastener comprising a head and a cutout, the cutout located between the head and a base of the first portion of the first monolithic fastener;
placing a second portion of the first monolithic fastener over the first stud so that the first stud is inserted into an opening in the second portion;
repositioning the second portion of the first monolithic fastener relative to the first portion so that a ridge on the second portion passes through the cutout and the head of the first stud engages the ridge and is retained in the second portion by the ridge;

inserting a first stud of a first portion of a second monolithic fastener through a second opening in a second corner of a display panel;

placing a second portion of the second monolithic fastener over the first stud of the second monolithic fastener so that the first stud of the second monolithic fastener is inserted into an opening in the second portion of the second monolithic fastener;

repositioning the second portion of the second monolithic fastener relative to the first portion of the second monolithic fastener so that a ridge on the second portion of the second monolithic fastener passes through a cutout of the second monolithic fastener and the head of the first stud of the second monolithic fastener engages the ridge of the second monolithic fastener and is retained in the second portion of the second monolithic fastener by the ridge of the second monolithic fastener;

inserting a second stud of the first portion of the first monolithic fastener into a first opening in a first upright in a rack system; and inserting a second stud of the first portion of the second monolithic fastener into a second opening in a second upright in a rack system, whereby the display panel is suspended from the first and second uprights in the rack system.

19. The method of claim 18, wherein the first portions and second portions of the monolithic fasteners are connected by a flexible connecting portion.

20. The method of claim 18, wherein the first studs of the first portions of the first and second monolithic fasteners and the second studs of the first portions of the first and second monolithic fasteners extend from the base in opposite directions.

21. The method of claim 18, wherein the second studs of the second portions of the first and second monolithic fasteners comprise a flange for engaging the opening in the uprights in the rack system.

22. The method of claim 18, wherein the first and second openings in the rack system are teardrop-shaped openings.

23. The method of claim 18, wherein the monolithic fasteners comprises plastic.

\* \* \* \* \*